United States Patent
Kuroda et al.

(10) Patent No.: US 7,546,106 B2
(45) Date of Patent: Jun. 9, 2009

(54) ELECTRONIC CIRCUIT

(75) Inventors: Tadahiro Kuroda, Yokohama (JP); Daisuke Mizoguchi, Yokohama (JP); Noriyuki Miura, Yokohama (JP)

(73) Assignee: Keio University, Tokyo (JP)

( * ) Notice: Subject to any disclaimer, the term of this patent is extended or adjusted under 35 U.S.C. 154(b) by 542 days.

(21) Appl. No.: 11/302,501

(22) Filed: Dec. 14, 2005

(65) Prior Publication Data
US 2006/0176676 A1   Aug. 10, 2006

(30) Foreign Application Priority Data
Dec. 15, 2004   (JP)   ............... 2004-362460

(51) Int. Cl.
H04B 1/18   (2006.01)
(52) U.S. Cl. .................. 455/292; 455/41.1; 174/262; 29/846
(58) Field of Classification Search ............. 455/41.1, 455/292, 280; 174/260, 262; 29/846, 830, 29/842
See application file for complete search history.

(56) References Cited

U.S. PATENT DOCUMENTS

| | | | |
|---|---|---|---|
| 5,608,417 A * | 3/1997 | de Vall ................ | 343/895 |
| 5,701,037 A | 12/1997 | Weber et al. | |
| 6,000,128 A * | 12/1999 | Umeno et al. ............ | 29/846 |
| 2003/0042571 A1 * | 3/2003 | Chen et al. .............. | 257/531 |
| 2005/0121763 A1 * | 6/2005 | Ucok et al. ............. | 257/685 |
| 2007/0274198 A1 * | 11/2007 | Kuroda et al. ........... | 370/201 |
| 2007/0289772 A1 * | 12/2007 | Kuroda et al. ........... | 174/260 |

FOREIGN PATENT DOCUMENTS

| | | |
|---|---|---|
| JP | 10-255003 | 9/1998 |
| JP | 2002-057350 | 2/2002 |
| JP | 2003-008481 | 1/2003 |

(Continued)

OTHER PUBLICATIONS

Miura, Noriyuki, et al.; "Analysis and Design of Transceiver Circuit and Inductor Layout for Inductive Inter-chip Wireless Superconnect;" *IEEE 2004 Symposium on VLSI Circuits; Digest of Technical Papers*; pp. 246-249. (2004).

(Continued)

*Primary Examiner*—Edward Urban
*Assistant Examiner*—Christian A Hannon
(74) *Attorney, Agent, or Firm*—Edwards Angell Palmer & Dodge LLP

(57) ABSTRACT

An electronic circuit capable of carrying out communications by inductive coupling with minimum power consumption between substrates. Although the amplification factor of the amplifier $10a$ is 1, the amplification factors of the amplifiers $10b$ through $10d$ are, respectively, 2, 4 and 8. Amplification is carried out at the amplification factors 1 through 15 (=1+2+4+8) as a whole by a combination thereof. The transmit power control register 21 outputs ON and OFF signals to the respective amplifiers $10a$ through $10d$ so as to bring about transmit power responsive to the distance to a substrate having a receiver coil which is a destination of transmission (that is, the distance between a transmitter coil and a receiver coil), in further detail, so as to have an amplification factor by which transmit power proportionate to the distance can be obtained, and selects a combination of the amplifiers $10b$ through $10d$.

1 Claim, 5 Drawing Sheets

FOREIGN PATENT DOCUMENTS

| JP | 2005-228981 | 8/2005 |
|----|-------------|--------|
| JP | 2005-348264 | 12/2005 |
| JP | 2006-050354 | 2/2006 |

OTHER PUBLICATIONS

Miura, Noriyuki, et al.; "Cross Talk Countermeasures in Inductive Inter-chip Wireless Superconnect;" *IEEE 2004 Custom Integrated Circuits Conference*; pp. 99-102. (2004).

Mizoguchi, Daisuke, et al.; "A 1.2Gb/s/pin Wireless Superconnect Based on Inductive Inter-Chip Signaling (IIS);" *2004 IEEE International Solid-State Circuits Conference; Digest of Technical Papers*; pp. 142-143 and p. 517. (2004).

K. Kanda et al., "1.27Gb/s/pin, 3mW/pin Wireless Superconnect(WSC) Interface Scheme," IEICE Technical Report, vol. 103, No. 88 (ICD2003-16), May 2003, pp. 19-22.

Office Action mailed Mar. 26, 2008, issued in the corresponding Japanese patent application No. 2004-362460.

Office Action mailed Aug. 27, 2008, issued in the corresponding Japanese patent application No. 2004-362460.

* cited by examiner

F I G. 1
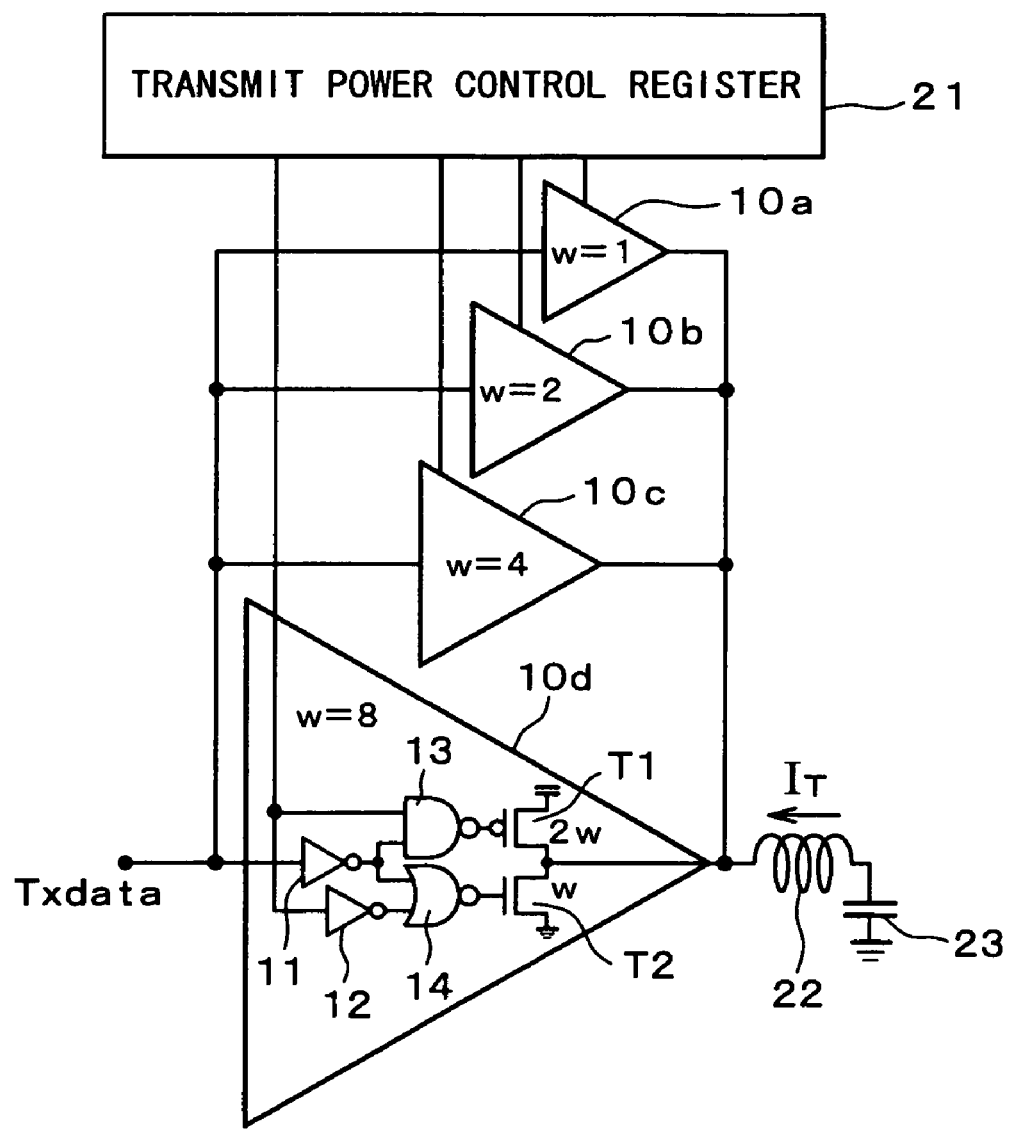

ELECTRONIC CIRCUIT

BACKGROUND OF THE INVENTION

1. Field of the Invention

The present invention relates to an electronic circuit that is capable of suitably carrying out communications between substrates such as IC (Integrated Circuit) bare chips, and PCB (Printed Circuit Boards).

2. Description of the Related Art

The inventor et al. have proposed to achieve a system-in-package (SiP) for sealing a plurality of bare chips in one package of LSI (Large-Scale Integration) by a method for three-dimensionally mounting chips and electrically connecting chips to each other by inductive coupling (see Patent Document 1).

FIG. 5 is a view depicting a configuration of an electronic circuit according to the invention in Japanese earlier application. The electronic circuit is composed of the first through the third LSI chips 31a through 31c. This is an example in which LSI chips are stacked up in three layers and a bus is formed so as to lie across three chips. That is, a single communication channel capable of carrying out communications among the three (three LSI chips) is constructed. The first LSI chip 31a through the third LSI chip 31c are vertically stacked up, and the respective chips are fixed to each other with an adhesive agent. The first transmitter coil 33a through the third transmitter coil 33c, which are respectively used for transmission, are formed by wiring on the first LSI chip 31a through the third LSI chip 31c, and also, the first receiver coil 35a through the third receiver coil 35c, which are respectively used for receiving, are formed by wiring thereon. The three pairs of transmitter and receiver coils 33 and 35 are disposed on the first LSI chip 31a through the third LSI chip 31c so that the centers of openings of the transmitter and receiver coils 33 and 35 are made coincident with each other. Accordingly, the three pairs of transmitter and receiver coils 33 and 35 form inductive coupling, thereby enabling communications. The first transmitter circuit 32a through the third transmitter circuit 32c are connected to the first transmitter coil 33a through the third transmitter coil 33c respectively, and the first receiver circuit 34a through the third receiver circuit 34c are connected to the first receiver coil 35a through the third receiver coil 35c respectively. The transmitter and receiver coils 33 and 35 are three-dimensionally mounted as coils having one or more windings in an area permitted for communications, utilizing a multi-layered wiring of a process technology. A profile best suitable for communications exists in the transmitter and receiver coils 33 and 35, and it is necessary that they have an optimal number of times of winding, optimal opening, and optimal line width. Generally, the transmitter coils 33 are smaller than the receiver coils 35.

[Patent Document 1] Japanese Unexamined Patent Application Publication No. 2005-228981

SUMMARY OF THE INVENTION

Problem To Be Solved by the Invention

Herein, where it is assumed that the transmit power of the respective transmitter circuits is the same and is constant, the transmit power is required to match the distance between the farthest substrates, wherein power consumption is accordingly increased.

The invention was developed in view of the above-described situations, and it is therefore an object of the invention to provide an electronic circuit capable of carrying out communications between substrates based on inductive coupling with minimum power consumption.

Means for Solving the Problem

An electronic circuit according to the invention includes: a first substrate including a first receiver coil that is formed by wiring on a substrate and receives signals and a first receiver circuit into which signals from the first receiver coil are inputted; a second substrate including a second receiver coil that is formed by wiring on a substrate and receives signals and a second receiver circuit into which signals from the second receiver coil are inputted; and a third substrate including a transmitter coil that is formed by wiring on a substrate at a position corresponding to the first receiver coil and the second receiver coil, constructs a communications channel by being inductively coupled with the first receiver coil and the second receiver coil and transmits signals, and a transmitter circuit that outputs signals at the first transmit power in the case of transmitting to the first receiver coil and output signals at the second transmit power different from the first transmit power in the case of transmitting to the second receiver coil.

In addition, since the first substrate has a plurality of the first receiver coils, the second substrate has a plurality of the second receiver coils, and the third substrate has a plurality of transmitter coils that are formed at positions corresponding to the first receiver coil and the second receiver coil, constructs a communications channel by being inductively coupled to the first receiver coil and the second receiver coil, and transmits signals respectively, the above-described power control can be applied where these parallel communications channels are provided, wherein it is possible to reduce influences of crosstalk.

Further, since the transmitter circuit outputs signals to the transmitter coil at transmit power proportionate to the distance between the transmitter coil and the first or the second receiver coil which is a destination of transmission, it is possible to achieve communications between substrates with minimum power consumption required.

Effect of the Invention

According to the invention, communications can be carried out between substrates based on inductive coupling with minimum power consumption.

The present specification includes the contents described in the specification and/or the drawings of Japanese Patent Application No. 2004-362460 which is the foundation of priority of the present application.

BRIEF DESCRIPTION OF THE DRAWINGS

FIG. 1 is a view depicting a configuration of a transmitter circuit in an electronic circuit according to an embodiment of the invention;

DETAILED DESCRIPTION OF THE INVENTION

Figure 2:
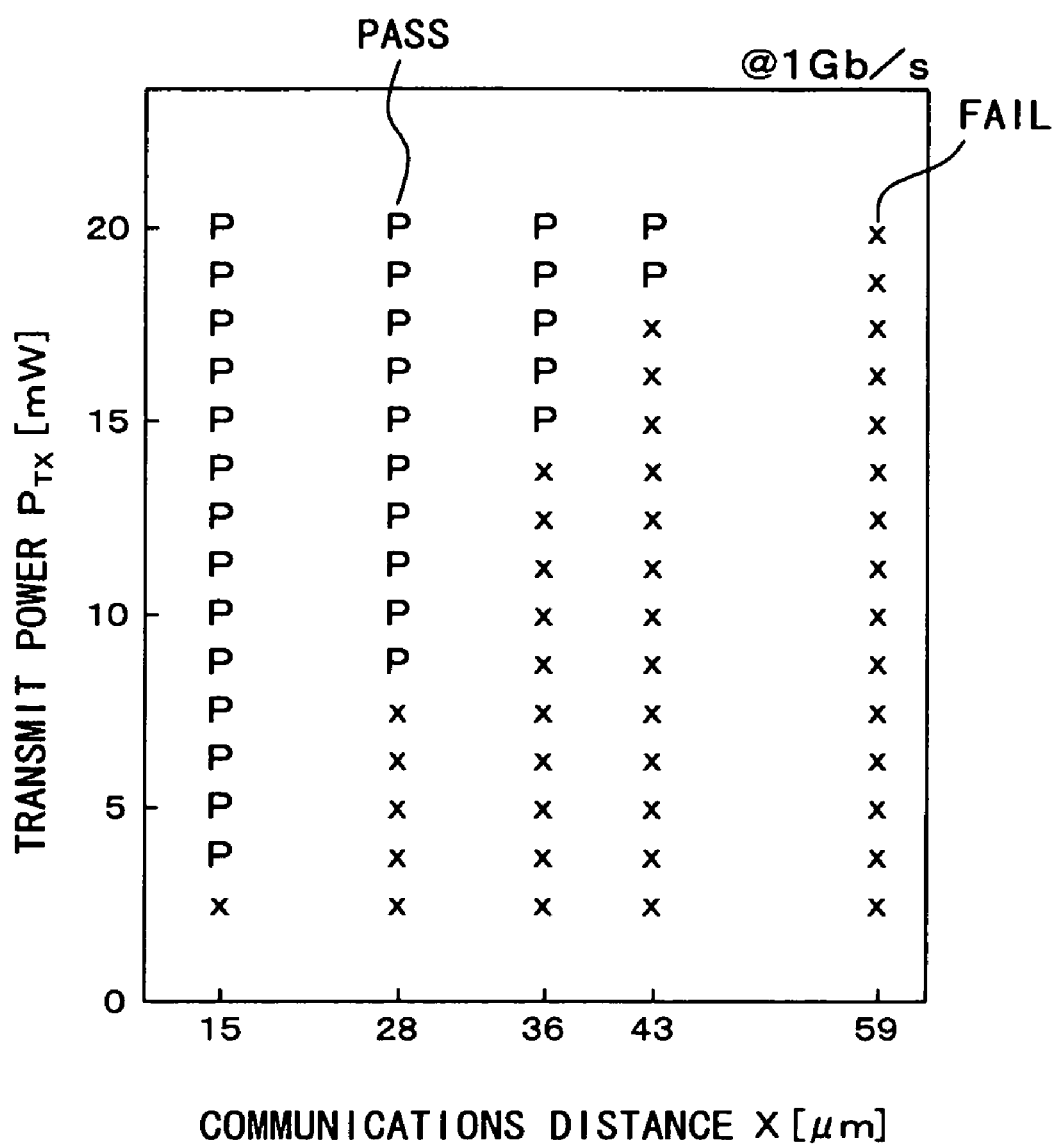
FIG. 2 is a view depicting the relationship between a communications distance and transmit power.

Hereinafter, a detailed description is given of preferred embodiment for carrying out the invention with reference to the accompanying drawings.

FIG. 1 is a view depicting the configuration of a transmitter circuit in an electronic circuit according to the embodiment of the invention. The transmitter circuit includes amplifiers 10a through 10d, a transmit power control register 21, and a capacitor 23. The four amplifiers 10a through 10d are controlled to be turned on and off by means of the transmit power control register 21, and drive a transmitter coil 22. The respective four amplifiers 10a through 10d are composed of the same circuit configuration, but have different amplification factors. Although the amplification factor of the amplifier 10a is 1, the amplification factors of the amplifiers 10b through 10d are, respectively, 2, 4 and 8. It is possible as a whole to amplify at amplification factors 1 through 15 (=1+2+4+8) by combinations of the above amplification factors. For example, the amplifier 10d, which is one thereof, is composed of NOT11, NOT12, NAND13, NOR14 and transistors T1, T2. The transistors T1 and T2 form an inverter of CMOS (Complementary Metal Oxide Semiconductor) structure, function as a buffer and drive the transmitter coil 22. For example, by varying the channel width W of these transistors T1 and T2, it is possible to vary the amplification factor of the amplifier 10d, etc. The capacitor 23 may be easily produced by using capacitance of a MOS transistor. When carrying out transmission using the amplifier 10d, that is, if inputted transmitting data Txdata becomes from LOW to HIGH when HIGH is outputted from the transmit power control register 21 to the amplifier 10d, the transistor T1 is turned from ON to OFF, and at the same time, the transistor T2 is turned from OFF to ON, wherein a current IT is caused to flow at the transmitter coil 22, and the capacitor 23 is charged to be negative. The current IT stops when the capacitor 23 is sufficiently charged, and consequently a pulse current of a triangular wave-shape flows at the transmitter coil 22. Next, when the transmitting data Txdata becomes from HIGH to LOW, the transistor T1 is turned from OFF to ON, and the transistor T2 is turned from ON to OFF, wherein a current IT inversely flows at the transmitter coil 22, and the capacitor 23 is discharged. As the capacitor 23 is sufficiently discharged, the current IT stops, wherein a triangular wave-shaped pulse current of inverted polarity flows at the transmitter coil 22.

The transmit power control register 21 outputs ON/OFF signals to the respective amplifiers 10a through 10d and selects a combination of the amplifiers 10a through 10d so as to obtain transmit power responsive to the distance to a substrate having a receiver coil which is a destination of transmission (that is, the distance between the transmitter coil and the receiver coil), in further detail, to bring about an amplification factor at which transmit power proportionate to the distance can be obtained.

FIG. 2 is a view depicting the relationship between a communications distance and transmit power. In the embodiment, the drawing shows whether communications is possible (this is depicted as Pass:P) or impossible (this is depicted as Fail: X) where it is assumed that the communication speed is 1 Gb/s and the transmit power PTX is 3 through 20 [mW] for communications distances X=15, 28, 36, 43 and 59 [μm]. Based thereon, it is understood that the minimum transmit power required for the communications distances X=15, 28 and 43 [μm] are, respectively, PTX=4, 9, 19 [mW]. The transmit power control register 21 (FIG. 1) is set to the minimum transmit power required for these communications distances. Thus, by bringing about the transmit power responsive to the communications distance, the power consumption can be reduced as a whole.

Figure 3:
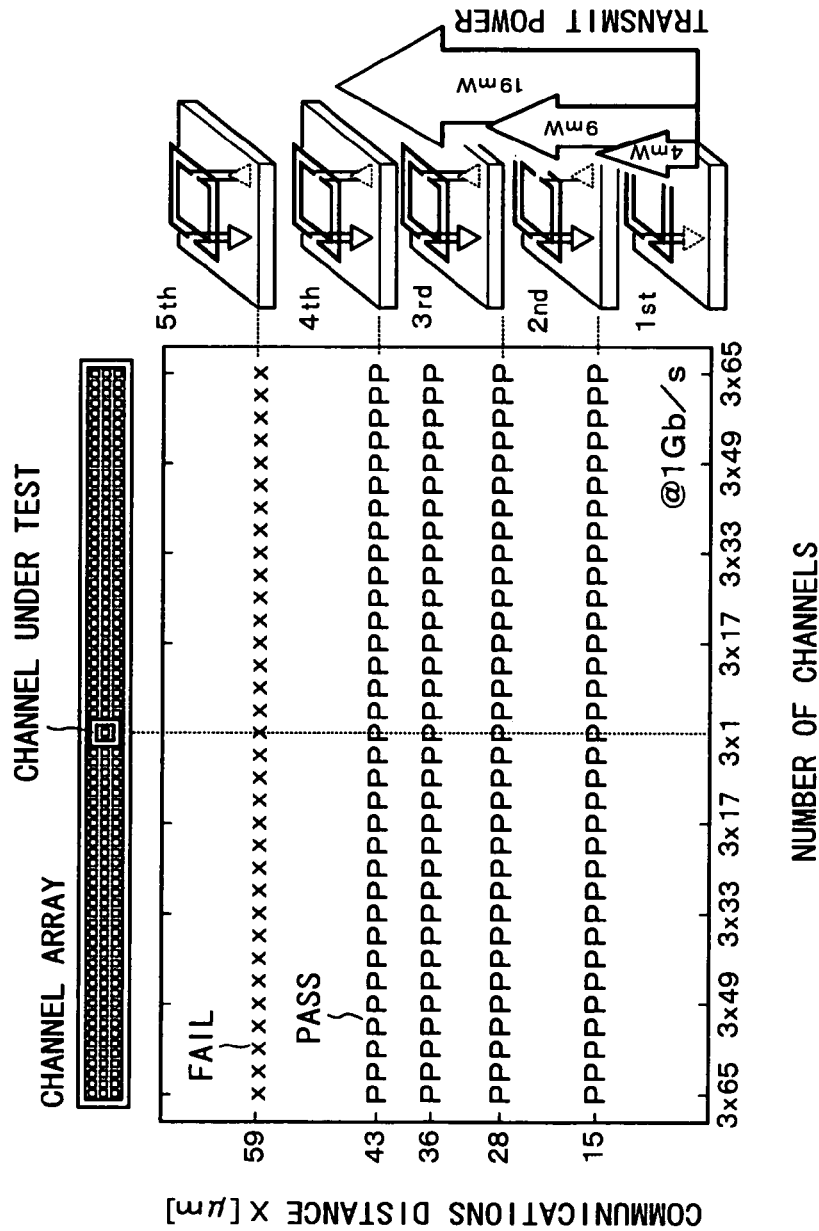
FIG. 3 is a view depicting crosstalk according to the embodiment of the invention.

FIG. 3 is a view depicting crosstalk according to the embodiment of the invention. In order to look into influences that the invention exerts on the crosstalk, the crosstalk was tested in regard to where transmit power is controlled based on the invention and where transmit power is not controlled. The testing conditions are as follows: Transmitter and receiver coils whose size is 50 μm×50 μm are arranged as an array in which 3 coils are longitudinally disposed and 129 coils are transversely disposed (the 1st coil is disposed at the middle in the transversal direction, and the 65th coil is disposed at both sides), and is made into a channel array, wherein the middle transmitter and receiver coils in the longitudinal and transversal directions are made into a channel under test. A signal is transmitted from the transmitter coil of the channel under test, and a pseudo random binary sequence signal (PRBS) is transmitted from the other transmitter coils. In the other transmitter coils, signals are transmitted from the middle channels (two first channels) at the beginning, and the transmitter coils are gradually increased by 3+3 channels in both sides. Finally, signals are transmitted from all the transmitter coils. The communication speed is 1 Gb/s. Channels adjacent in the longitudinal and transversal directions are driven by time-sharing, so that no crosstalk is theoretically generated. According to the results of the tests, where transmission is carried out at the minimum transmit power required for the respective communications distances according to the invention, that is, where the transmit power PTX is made into 4, 9, and 19 [mW] for the communications distances X=15, 28, and 43 [μm], respectively, communications can be normally carried out in the channel under test even in a case where all the channels transmit signals, excepting the case of the communications distance X=59 [μm] as depicted in the drawing.

Figure 4:
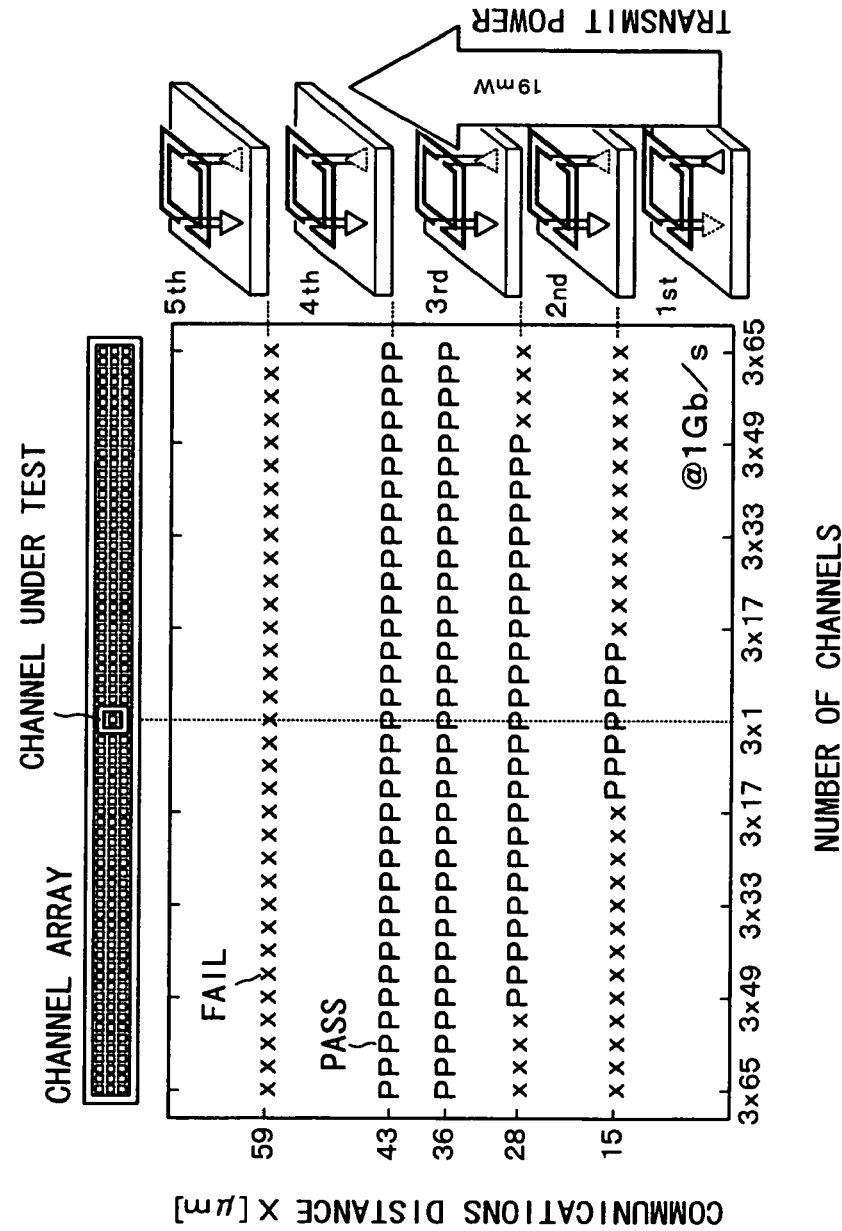
FIG. 4 is a view depicting crosstalk not depending on the invention.
Figure 5:
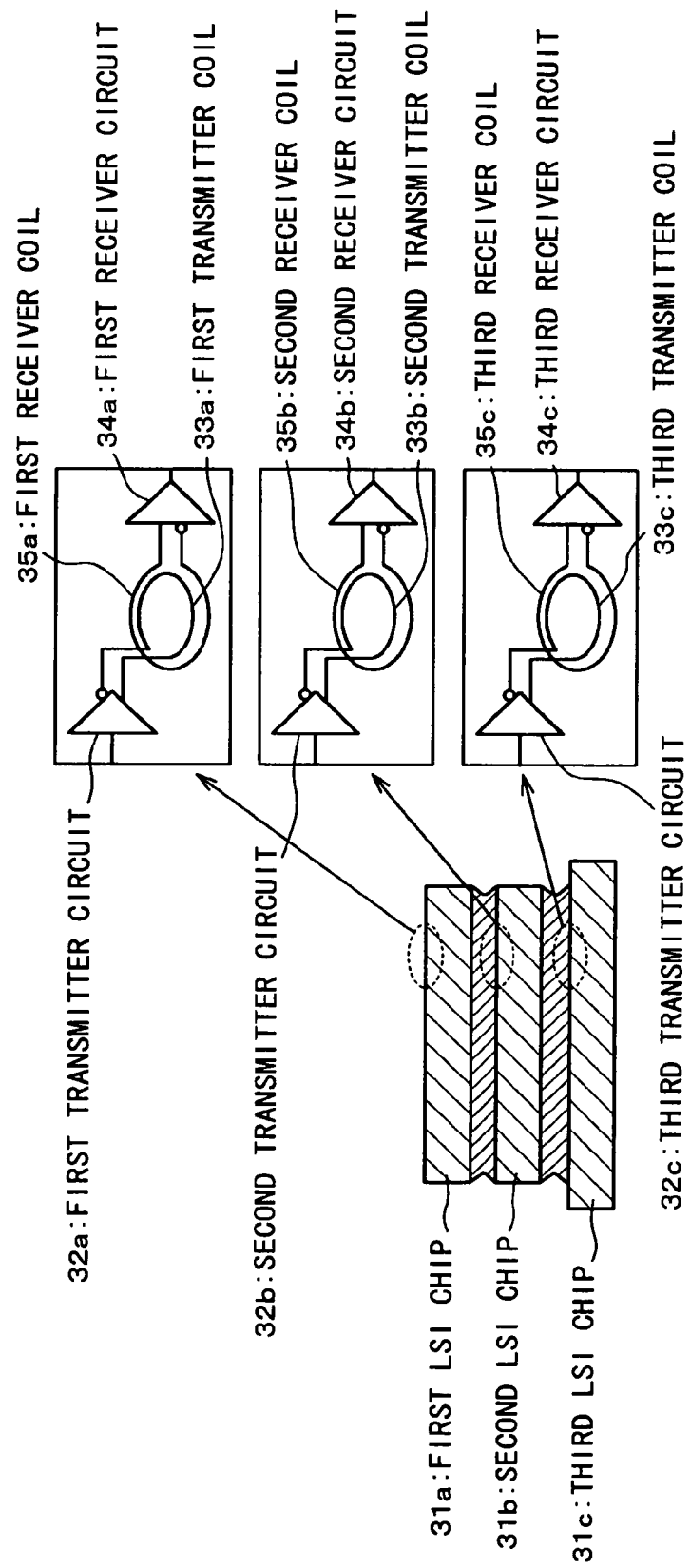
FIG. 5 is a view depicting the configuration of an electronic circuit according to the invention in Japanese earlier application.

FIG. 4 is a view depicting crosstalk not depending on the invention. The test was carried out under the same conditions as those described above, excepting that all the transmit power PTX is 19 [mW]. Although communications can be normally carried out at the communications distance X is 43 [μm], it is understood that the communications cannot be carried out due to crosstalk when the number of communications channels exceeds a specified number if the other channels subjected to communications are increased at the communications distance X=15 and 28 [μm].

Thus, where a plurality of channels are disposed in parallel, influences due to crosstalk can be reduced if transmit power responsive to the distances is obtained.

In addition, the invention is not limited to the above-described embodiment.

Where a signal is simultaneously transmitted from one substrate to the other plurality of far and near substrates, the transmit power may be controlled so that the signal is transmitted with transmit power corresponding to the distance to the substrate which is the farthest destination of communications. In this case, if communications through channels close to each other between substrates at short distances are stopped, it is possible to reduce the crosstalk.

All the publications, patents and patent applications cited in the present specification are included, as they are, as references.

What is claimed is:
1. An electronic circuit comprising:
 a first substrate including a first receiver coil that is formed by wiring on a substrate and receives signals, and a first receiver circuit into which signals from said first receiver coil are inputted;
 a second substrate including a second receiver coil that is formed by wiring on a substrate and receives signals, and a second receiver circuit into which signals from said second receiver coil are inputted; and a third substrate including a transmitter coil that is formed by wiring on a substrate at a position corresponding to said first receiver coil and said second receiver coil, constructs a communications channel by being inductively coupled with said first receiver coil and said second receiver coil and transmits signals, and a transmitter circuit that outputs signals at a first transmit power level in the case of transmitting to said first receiver coil and output signals at a second transmit power level different from the first transmit power level in the case of transmitting to said second receiver coil, wherein said first substrate has a plurality of said first receiver coils;

said second substrate has a plurality of said second receiver coils, and said third substrate has a plurality of said transmitter coils that are formed at positions corresponding to said first receiver coils and said second receiver coils, constructs a communications channel by being inductively coupled to said first receiver coils and said second receiver coils, and transmits signals respectively.

* * * * *